United States Patent
Oe et al.

(10) Patent No.: US 8,627,794 B2
(45) Date of Patent: Jan. 14, 2014

(54) FLUID BRAKE DEVICE AND VARIABLE VALVE TIMING APPARATUS

(75) Inventors: Shuhei Oe, Nukata-gun (JP); Kuniaki Oka, Nishio (JP); Makoto Otsubo, Anjo (JP); Jun Yamada, Okazaki (JP); Kenichi Nara, Nagoya (JP); Seiichiro Washino, Nagoya (JP)

(73) Assignee: Denso Corporation, Kariya (JP)

( * ) Notice: Subject to any disclaimer, the term of this patent is extended or adjusted under 35 U.S.C. 154(b) by 9 days.

(21) Appl. No.: 13/472,838

(22) Filed: May 16, 2012

(65) Prior Publication Data

US 2012/0291732 A1 Nov. 22, 2012

(30) Foreign Application Priority Data

May 17, 2011 (JP) .................................. 2011-110614

(51) Int. Cl.
*F01L 1/34* (2006.01)

(52) U.S. Cl.
USPC ...................... 123/90.17; 123/90.15; 464/160

(58) Field of Classification Search
USPC ...................... 123/90.15, 90.17; 464/1, 2, 160
See application file for complete search history.

(56) References Cited

U.S. PATENT DOCUMENTS 8,245,679 B2 * 8/2012 Morishima ................ 123/90.17
2010/0095920 A1 4/2010 Morishima

* cited by examiner

*Primary Examiner* — Ching Chang
(74) *Attorney, Agent, or Firm* — Nixon & Vanderhye PC (57) ABSTRACT

A fluid brake device has a case defining a fluid chamber. Magneto-rheological fluid is contained in the fluid chamber. A brake member is rotatably supported on the case and receives a braking torque according to the viscosity of the magneto-rheological fluid. The device has a movable member driven by a thermo-sensitive wax so that a volume of the fluid chamber is increased as the temperature in the fluid chamber is increased. The movable member is driven to maintain a pressure in the fluid chamber within an allowable range when the temperature in the fluid chamber is changed.

12 Claims, 9 Drawing Sheets

FLUID BRAKE DEVICE AND VARIABLE VALVE TIMING APPARATUS

CROSS REFERENCE TO RELATED APPLICATION

This application is based on Japanese Patent Application No. 2011-110614 filed on May 17, 2011, the disclosure of which is incorporated herein by reference.

TECHNICAL FIELD

The disclosure relates to a fluid brake device and a variable valve timing apparatus with the fluid brake device.

BACKGROUND

Conventionally, a fluid brake device is known. A fluid brake device carries out variable control of a viscosity of a magneto-rheological fluid (MRF) which is contained within a fluid chamber formed in a container and come in contact with a brake member by controlling magnetic flux passing through the MRF. The fluid brake device can apply braking torque to the brake member by comparatively small electric power. Therefore, the fluid brake device is preferable to a variable valve timing apparatus which adjusts a relative angular phase between a crankshaft and a camshaft according to a braking torque generated by the fluid brake device. The relative angular phase may be called as an engine phase indicating a valve operating timing.

JP 2010-121613A discloses one of the variable valve timing apparatus with the fluid brake device. The device has a case, a brake member disposed in the case, and a brake shaft fixed on the brake member and rotatably supported on the case. The device has a fluid sealing structure fluidly seals between the brake shaft and the case. The device further has a movable member that increases or decreases a capacity of the fluid chamber in accordance with an increase or decrease of pressure within the fluid chamber. In the disclosed fluid brake device, a temperature in the fluid chamber may be increased by thermal energy produced by friction between the MRF and the brake member, etc. The movable member may moves to increase the capacity of the fluid chamber in response to a pressure increase within the fluid chamber caused by a temperature increase. Since a capacity increase of the fluid chamber can decrease a pressure in the fluid chamber, the capacity increase caused by the movable member may reduce a pressure increase within the fluid chamber.

SUMMARY

According to a passive volume adjusting structure disclosed in the document, it is hard to keep moving the movable member until the pressure increase is completely canceled. In detail, as the volume of the fluid chamber is increased by the movement of the movable member, driving force acting on the movable member caused by the pressure is decreased. Therefore, for example, a diaphragm, i.e., the movable member, stops moving at a location where resilience, e.g., an elasticity, and pressure in the fluid chamber balance before the pressure increase is completely canceled. Similarly, a piston, i.e., the movable member, is prevented from moving by a friction between the piston and a brake shaft before the pressure increase is completely canceled.

In those cases, at least a part of the pressure increase caused by the temperature increase may not be canceled and may remain within the fluid chamber. Therefore, this pressure increase may result in a leak of the MRF through a sealing structure between the case and the brake shaft.

It is an object of the present disclosure to provide a fluid brake device which is capable of being reducing characteristic change caused by a leakage of the MRF from the fluid chamber.

It is another object of the present disclosure to provide a variable valve timing apparatus which is capable of being reducing characteristic change caused by a leakage of the MRF from the fluid chamber.

According to an embodiment of the disclosure, a fluid brake device is provided. The fluid brake device comprises a case defining a fluid chamber inside, and magneto-rheological fluid, which has a viscosity variable according to a magnetic flux passing therethrough, contained in the fluid chamber. The fluid brake device comprises a viscosity control section to carry out variable control of the viscosity of the magneto-rheological fluid by modifying magnetic flux passing through the magneto-rheological fluid in the fluid chamber. The fluid brake device comprises a brake member which has a brake shaft penetrating the case and is rotatably supported on the case to come into contact with the magneto-rheological fluid so that the brake member receives a braking torque according to the viscosity of the magneto-rheological fluid. The fluid brake device comprises a sealing structure which seals between the case and the brake shaft.

The fluid brake device comprises a thermo-sensitive chamber formed on a supporting member provided by one of the case and the brake member so as to be thermally conductive with the fluid chamber. The fluid brake device comprises a movable member which has an inner part accommodated in the thermo-sensitive chamber, and an exposed part exposed to the fluid chamber by being supported on the supporting member.

The fluid brake device comprises a variable-volume member disposed in the thermo-sensitive chamber. The variable-volume member is capable of changing a volume itself in response to a temperature in the thermo-sensitive chamber, and applying force on the inner part to move the movable member so that a volume of the fluid chamber is increased as the temperature in the thermo-sensitive chamber is increased.

The variable-volume member actively drives and moves the movable member in response to the temperature in the fluid chamber. The fluid chamber may get an increased volume by the movement of the movable member, it is not easy to keep the internal pressure in the fluid chamber in an increased state caused by the temperature increase. It is possible to reduce the leakage of the magneto-rheological fluid through the sealing structure. Therefore, it is possible to suppress a change of the brake characteristic resulting from the leakage of the magneto-rheological fluid.

According to an embodiment, a variable valve timing apparatus is provided. The variable valve timing apparatus adjusts a valve timing of a valve, which is driven to open and close by a camshaft to which torque transmitted from a crankshaft in an internal combustion engine. The variable valve timing apparatus comprises the fluid brake device, and an phase adjusting mechanism engaged with the brake shaft at an outside of the case for adjusting an relative phase between the crankshaft and the camshaft according to the braking torque acting on the brake member.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, embodiments of the disclosure are described in detail referring to the attached drawings. In the description, redundant explanation is omitted by using the same reference numbers to indicate the same or corresponding members. In a case that only a part of component or part is described, other descriptions for the remaining part of component or part in the other description may be incorporated. The embodiments can be partially combined or partially exchanged in some forms which are clearly specified in the following description. In addition, it should be understood that, unless trouble arises, the embodiments can be partially combined or partially exchanged each other in some forms which are not clearly specified.

(First Embodiment)

Figure 1:
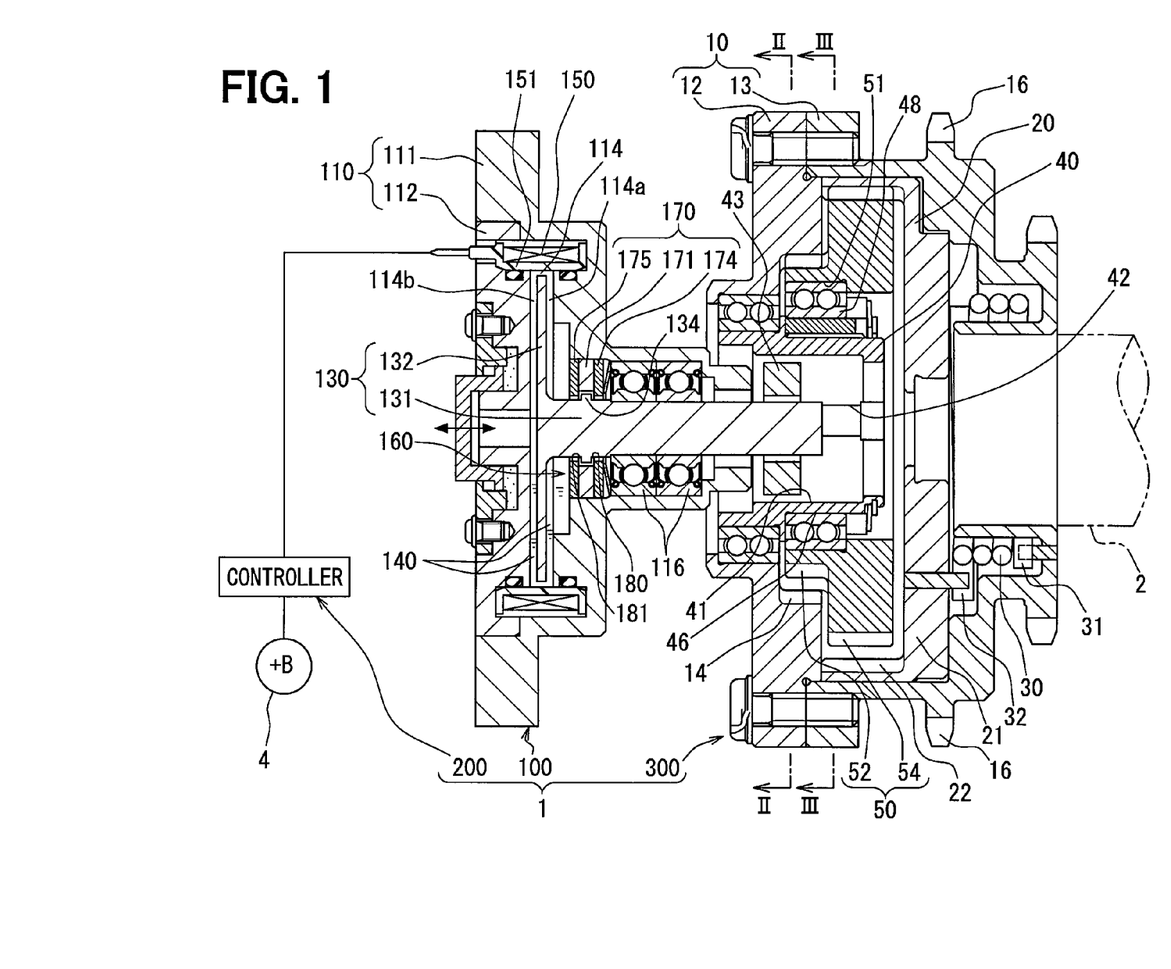
FIG. 1 is a cross sectional view, on a I-I cross section in FIG. 2, of a variable valve timing apparatus according to a first embodiment of the disclosure.

FIG. 1 shows a variable valve timing apparatus 1 having a fluid brake device 100 according to a first embodiment of the disclosure. The variable valve timing apparatus 1 is mounted on an engine on a vehicle. The variable valve timing apparatus 1 is installed in a torque transmission train which transmits engine torque to a camshaft 2 from a crankshaft. The camshaft 2 opens and closes at least one of valves among intake and exhaust valves of the internal combustion engine. The variable valve timing apparatus 1 varies and adjusts the valve timing of at least one of the intake valves.

Figure 2:
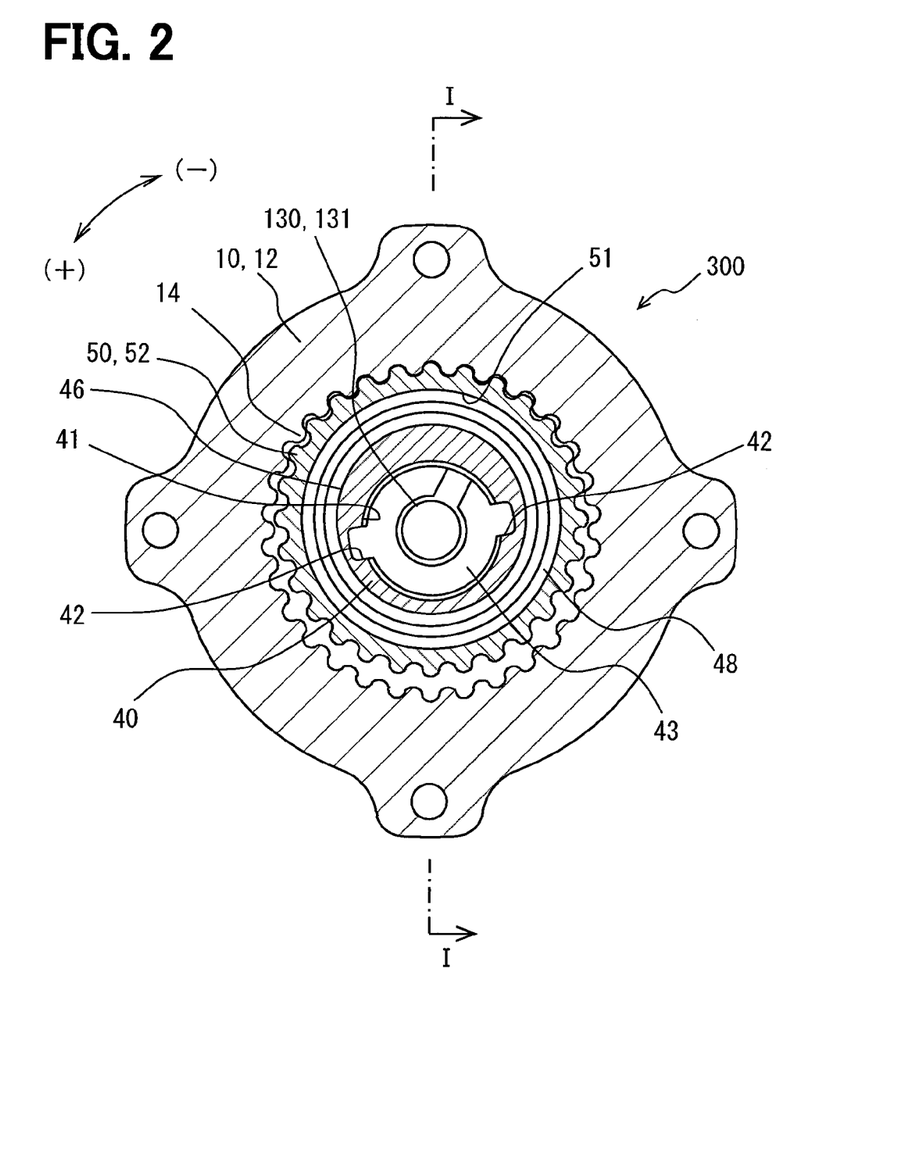
FIG. 2 is a cross sectional view showing a II-II cross section in FIG. 1.
Figure 3:
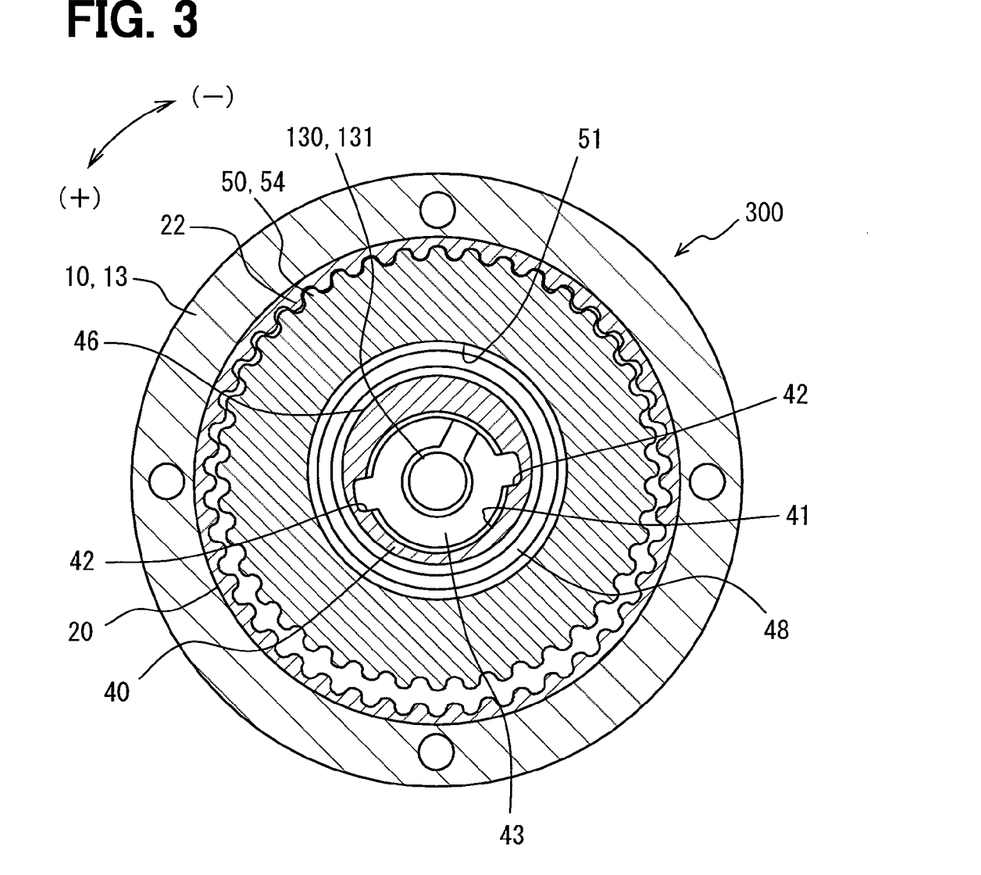
FIG. 3 is a cross sectional view showing a III-III cross section in FIG. 1.

As shown in FIGS. 1-3, the variable valve timing apparatus 1 has components such as a fluid brake device 100, a control circuit 200 and a phase adjusting mechanism 300. The variable valve timing apparatus realizes desired valve timing by adjusting an engine phase that is a relative phase between the camshaft 2 and the crankshaft. The engine phase may be indicated by an angular difference from a rotating angle of the crankshaft to a rotating angle of the camshaft 2.

(Fluid Brake Device)

The fluid brake device 100 is an electric driven device. The fluid brake device 100 is an electromagnetic device. The fluid brake device 100 has components such as a case 110, a brake member 130, a magneto-rheological fluid (MRF) 140, a sealing structure 160, and a solenoid coil 150.

The case 110 is formed in a hollow shape. The case 110 has a fixing member 111 and a cover member 112. The case 110 defines a fluid chamber 114 therein. The fixing member 111 is formed in a cylindrical shape with steps. The fixing member 111 is made of a magnetic material. The fixing member 111 is fixedly secured on a chain case (not illustrated) which is a stable portion of the internal combustion engine. The cover member 112 is formed in a circular dish shape. The cover member 112 is made of a magnetic material that may be the same as or similar to the fixing member 111. The cover member 112 is disposed on the fixing member 111 to be placed on an opposite side to the phase adjusting mechanism 300. In other words, the fixing member 111 has a far side which is opposite to a side close to the phase adjusting mechanism 300 and defines an end opening closed by the cover member 112 disposed thereon. The case 110 is disposed on an axial side of the phase adjusting mechanism 300 to place the fixing member 111 between the cover member 112 and the phase adjusting mechanism 300 in an axial direction. In this embodiment, the axial direction corresponds to the longitudinal direction of the brake member 130 and the camshaft 2. The cover member 112 is inserted into the fixing member 111 in a coaxial manner and is fixedly secured in a sealing manner. The cover member 112 defines a chamber 114 with the fixing member 111. The chamber 114 may also be referred to as a fluid chamber 114 defined inside the case 110.

The brake member 130 is made of a magnetic material. The brake member 130 has a brake shaft 131 and a brake rotor 132. The brake shaft 131 is formed in a shaft shape. The brake shaft 131 is disposed to penetrate the fixing member 111, i.e., a part of the case 110. In other words, the case 110 has a wall which is placed on a side close to the phase adjusting mechanism 300 and is penetrated by the brake shaft 131. The brake shaft 131 has an outside end which is placed on an outside of the case 110 and is engaged with the phase adjusting mechanism 300. In other words, the phase adjusting mechanism 300 is engaged with the brake shaft 131 at an outside of the case 110. The phase adjusting mechanism 300 adjusts an relative phase between the crankshaft and the camshaft 2 according to the braking torque acting on the brake member 130. The brake shaft 131 has a middle portion in the axial direction. The middle portion is rotatably supported by a bearing 116 disposed on the fixing member 111, i.e., the case 110. During an operation of the internal combustion engine, torque outputted from the crankshaft is transmitted via the phase adjusting mechanism 300 and drives the brake member 130 to rotate in a predetermined direction, e.g., the counterclockwise direction in FIG. 2 and FIG. 3.

The brake rotor 132 is formed in a circular disc shape. The brake rotor 132 may have a plurality of through holes to communicate both sides of the brake rotor 132. The brake rotor 132 is formed on a proximal end of the brake shaft 131. In other words, the brake member 130 is supported on only one side of the brake rotor 132. The brake rotor 132 is disposed on the proximal end opposed to the distal end close to the phase adjusting mechanism 300 and is radially protruded from the proximal end. The fluid chamber 114 has a part which is placed and defined between the brake rotor 132 and the fixing member 111 and provides a magnetic gap 114a. The fluid chamber 114 also has a part which is placed and defined between the brake rotor 132 and the cover member 112 and provides a magnetic gap 114b.

Figure 4:
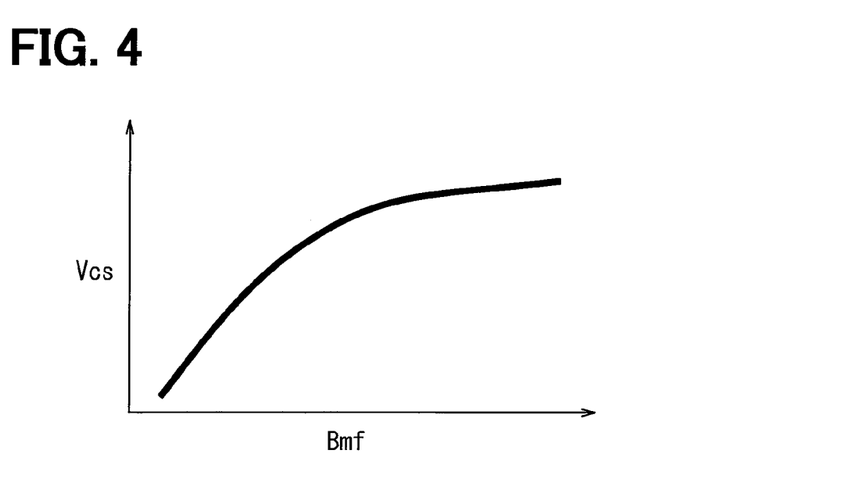
FIG. 4 is a characteristics chart for explaining characteristics of a magneto-rheological fluid.

The fluid chamber 114 contains the MRF 140. The MRF 140 is partially or completely filled in the fluid chamber 114. The MRF 140 is a kind of functional fluid which is made of nonmagnetic base liquid and magnetic particles suspended in the base liquid. The base liquid may be provided by a liquid that is nonmagnetic and hydrophobic property. For example, oil which is the same kind of a lubrication oil for the internal combustion engine may be used as the base liquid. The magnetic particles may be provided by a powdered magnetic material, such as carbonyl iron etc. The MRF 140 changes viscosity Vcs according to a magnetic flux Bmf passing therethrough as shown in FIG. 4. The MRF 140 shows a characteristic of apparent viscosity Vcs that is increased as a density of magnetic flux Bmf passing therethrough is increased. The apparent viscosity Vcs is increased in a proportional fashion to the density of magnetic flux Bmf. In addition, the MRF 140 shows a characteristic of yield stress that is increased proportional to the viscosity Vcs.

Figure 5:
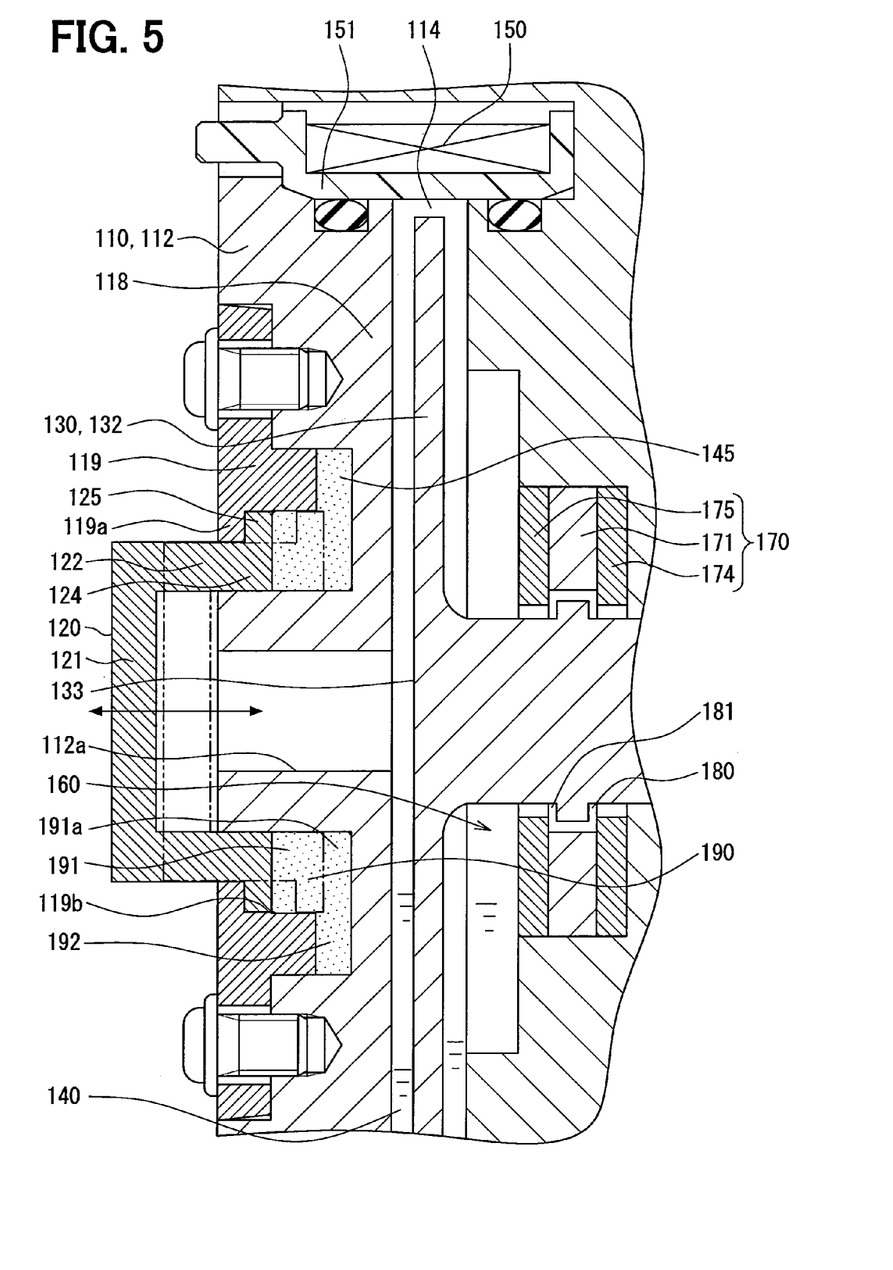
FIG. 5 is a cross sectional view showing a fluid brake device.

As shown in FIG. 1 and FIG. 5, the sealing structure 160 is formed in a part which is located between the fluid chamber 114 and the bearing 116 with respect to the axial direction in the case 110. The sealing structure 160 has a shaft flux guide 134 and a magnetic seal sleeve 170. The shaft flux guide 134 is made of a magnetic material and is disposed on the brake shaft 131 of the brake member 130. The shaft flux guide 134 is formed on the brake shaft to modulate magnetic flux for sealing purpose. The magnetic seal sleeve 170 is formed in a ring shape and is disposed on an outside of the shaft flux guide 134 to surround the shaft flux guide 134 along a rotational direction of the brake shaft 131. The magnetic seal sleeve 170 is provided by combining a permanent magnet 171 and a pair of sleeve flux guides 174 and 175 made of a magnetic material. A seal gap 180 is formed between the sleeve flux guide 174 and the shaft flux guide 134. A seal gap 181 is formed between the sleeve flux guide 175 and the shaft flux guide 134.

Magnetic flux from the permanent magnet 171 is guided through the sleeve flux guides 174 and 175 and the seal gaps 180 and 181 to the shaft flux guide 134. The magnetic flux may be concentrated at the seal gaps 180 and 181. The MRF 140 flows into the seal gaps 180 and 181. The magnetic flux passing the seal gaps 180 and 181 affects the MRF 140 to increase viscosity and catch the MRF 140 in the seal gaps 180 and 181. The MRF 140 is caught in the seal gaps 180 and 181 in annular film shapes. In this way, the MRF 140 performs a self-seal function in which the MRF 140 it self suppresses or prevents flow of the MRF 140 from an inside of the case 110 to an outside of the case 110. Thus, the sealing structure 160 prevents or suppresses a leakage of the MRF 140 leaking out from the inside of the case 110 to the outside of the case 110 by carrying out the seal between the brake shaft 131 and the fixing member 111.

The solenoid coil 150 has a resin bobbin 151 and a metal wire wound on the resin bobbin 151. The solenoid coil 150 is disposed on a radial outside of the brake rotor 132. The solenoid coil 150 is coaxially disposed with the brake rotor 132. The solenoid coil 150 is supported on the case 110 in a manner that the solenoid coil 150 is inserted and tightened between the fixing member 111 and the cover member 112 in the axial direction. By supplying energizing current to the solenoid coil 150, the solenoid coil 150 supplies magnetic flux flowing and passing through the fixing member 111, the magnetic gap 114*a*, the brake rotor 132, the magnetic gap 114*b*, and the cover member 112 in this order in the axial direction.

The magnetic flux passes through the MRF 140 in the magnetic gaps 114*a* and 114*b*. The MRF 140 changes, i.e., increases its viscosity and provide an increased viscous drag between the case 110 and the brake member 130. During operation of the internal combustion engine, the brake member 130 rotates relative to the case 110, the brake member 130 receives a braking torque from the MRF 140. The braking torque acts to make speed down and retard the rotation of the brake member 130, i.e., the brake rotor 132. Thus, the solenoid coil 150 generates the magnetic flux according to supplied current. The MRF 140 generates a viscosity according to the magnetic flux generated by the solenoid coil 150. The brake member 130 receives and inputs the braking torque according to the viscosity of the MRF 140. In other words, the solenoid coil 150 modulates the magnetic flux and the braking torque.

(Controller)

A controller 200 is provided to control an amount of energizing current supplied to the solenoid coil 150. The controller 200 is mainly provided by a microcomputer and may be referred to as a current control circuit. The controller 200 is mounted on the vehicle at a location apart from and exterior of the fluid brake device. The controller 200 is connected to both the solenoid coil 150 and a battery 4. During the internal combustion engine is not operated, the controller 200 is not supplied with the electric power from the battery 4 and cut current supply to the solenoid coil 150. Therefore, at this time, the magnetic flux is not generated, and no braking torque is inputted into the brake member 130.

On the other hand, during an operation of the internal combustion engine, the controller 200 is supplied with the electric power from the battery 4, and controls an amount of current supply to the solenoid coil 150. As a result, the solenoid coil 150 generates a regulated amount of the magnetic flux which passes through the MRF 140. Therefore, a variable control of the viscosity of the MRF 140 is performed by the controller 200. The brake torque inputted in the brake member 130 is controlled in a variable fashion in accordance with the current supplied to the solenoid coil 150.

(Phase Adjusting Mechanism)

As shown in FIGS. 1 to 3, the phase adjusting mechanism 300 is provided with a planetary gear mechanism and an assisting mechanism. The planetary gear mechanism includes a drive rotor 10, a driven rotor 20, a planetary carrier 40, and a planetary gear 50. The assisting mechanism includes an assisting member 30.

The drive rotor 10 is formed in a cylindrical shape. The drive rotor 10 has a gear member 12 and a sprocket member 13 placed on the same axis and joined by screws. As shown in FIGS. 1 and 2, the gear member 12 is formed in an annular plate shape. The gear member 12 is formed with a drive side internal-gear 14 which has tooth tops having diameter that are smaller than that of tooth bottoms. The sprocket member 13 is formed in a cylindrical shape. The sprocket member 13 is formed with a plurality of teeth 16 protruding outwardly from a peripheral wall portion. The sprocket member 13 is engaged with the crankshaft via a timing chain (not shown) which is provided between the teeth 16 and the crankshaft. Engine torque outputted from the crankshaft is transmitted to the sprocket member 13 through the timing chain. When the engine torque if transmitted, the drive rotor 10 rotates with the crankshaft in a synchronized manner. For example, the drive rotor 10 rotates in the counterclockwise rotation in FIGS. 2 and 3.

The driven rotor 20 is formed in a cylindrical shape with a bottom wall. The driven rotor 20 is disposed in a radial inside of the sprocket member 13 in a coaxial manner. The driven rotor 20 provides a bottom wall that provides a fixing portion 21 which is placed on the camshaft 2 in a coaxial manner and is fixedly secured on the camshaft 2 by a bolt. The driven rotor 20 is supported to be able to rotate with the camshaft 2 and to rotate relatively to the drive rotor 10. The driven rotor 20 rotates in the counterclockwise rotation in FIGS. 2 and 3.

The driven rotor 12 has a cylindrical wall on which a driven side internal-gear 22 is formed. The gear 22 has tooth tops having diameter that are smaller than that of tooth bottoms. The driven side internal-gear 22 has an inner diameter that is larger than an inner diameter of the drive side internal-gear 14. The driven side internal-gear 22 has greater number of teeth than that of the drive side internal-gear 14. The drive side internal-gear 14 and the driven side internal-gear 22 are disposed next to each other in the axial direction and on the same axis. The drive side internal-gear 14 is located between the driven side internal-gear 22 and the fluid brake device 100. The driven side internal-gear 22 is disposed between the drive side internal-gear 14 and the camshaft 2. The driven side internal-gear 22 is disposed next the drive side internal-gear 14 on a side opposite to a side close to the fluid brake device 100.

The assist member 30 is made of a torsion coil spring and is disposed on a radial inside of the sprocket member 13 in a coaxial manner. One end 31 of the assist member 30 is engaged on the sprocket member 13. The other end 32 of the assist member 30 is engaged on the fixing portion 21. The assist member 30 generates an assist torque by deformed in a twisting mode between the rotors 10 and 20. The assist torque pushes and urges the driven rotor 20 in a retard side, i.e., a delaying side with respect to the drive rotor 10.

The planetary carrier 40 is formed in a cylindrical shape having a cylindrical wall. The cylindrical wall is formed with a transmitter portion 41 through which the brake torque on the brake member 130 is transmitted. The transmitter portion 41 defines a circular through hole therein. The rotors 10 and 20, the brake member 130 and the transmitter portion 41 are arranged on the same axis. A pair of grooves 42 is formed on the transmitter portion 41. A joint member 43 is engaged with the grooves 42 and the brake shaft 131. The transmitter portion 41 and the brake shaft 131 are engaged via the joint member 43. The planetary carrier 40 is supported so that the planetary carrier 40 is able to rotate with the brake member 130 as a unit and that the planetary carrier 40 is able to rotate relative to the drive rotor 10. The planetary carrier 40 rotates in the counterclockwise rotation in FIGS. 2 and 3.

The planetary carrier 40 provides a cylindrical wall on which a bearing portion 46 for carrying the planetary gear 50 is formed. The bearing portion 46 provides a circular outer surface which has an axis shifted slightly from the axis of the rotors 10 and 20, and the brake shaft 131. In other words, the bearing portion 46 is eccentric to the rotors 10 and 20 and the brake shaft 131 and provides an eccentric support portion. The planetary gear 50 defines a center hole 51. A planetary bearing 48 is inserted and fixed on the inside of the center hole 51. The bearing portion 46 is inserted in the planetary bearing 48 and the center hole 51 to support the planetary gear 50 in an eccentric manner to the axis of the camshaft 2. The bearing portion 46, the planetary bearing 48 and the planetary gear 50 are arranged on the same axis.

As the planetary carrier 40 rotates about the axis of the rotors 10 and 20, the bearing portion 46 orbits and revolves about the axis of the rotors 10 and 20. The planetary gear 50 is supported by the bearing 46 so as to perform a planetary motion. In the planetary motion, the planetary gear 50 orbits about a center provided by the rotors 10 and 20 in an orbiting direction of the bearing portion 46. Simultaneously, the planetary gear 50 rotates about an eccentric center provided by the bearing portion 46. Therefore, when the planetary carrier 40 rotates about the axis of the rotors 10 and 20 in an orbiting direction of the planetary gear 50, the planetary gear 50 performs the planetary motion.

The planetary gear 50 is formed in a cylindrical shape with a step between a large diameter portion and a small diameter portion. The planetary gear 50 provides a cylindrical wall. The planetary gear 50 has outer gears 52 and 54 on the large diameter portion and the small diameter portion respectively.

The outer gears 52 and 54 are formed on outside surface of the cylindrical wall. The outer gears 52 and 54 have teeth that have tooth tops with larger diameter than that of tooth bottoms. The outer gear 52 provides a drive side outer gear 52 and is disposed in a radial inside of the drive side internal gear 14 to be partially meshed with. The outer gear 52 is partially meshed with the drive side internal gear 14 on a side to which the bearing portion 46 is shifted from the axis of the rotors 10 and 20 and the brake shaft 131.

The outer gear 52 and the outer gear 54 are arranged next to each other in the axial direction. The outer gear 52 is located closer to the fluid brake device 100 than the outer gear 54. The outer gear 54 is placed next to the outer gear 52 on a side opposite to the fluid brake device 100. The outer gear 54 provides a driven side outer gear 54 and is disposed in a radial inside of the driven side internal gear 22 to be partially meshed with. The outer gear 54 is partially meshed with the driven side internal gear 22 on a side to which the bearing portion 46 is shifted from the axis of the rotors 10 and 20 and the brake shaft 131. The driven side outer gear 54 has an outer diameter that is larger than an outer diameter of the drive side outer gear 52.

The driven side outer gear 54 has greater number of teeth than that of the drive side outer gear 52. The driven side outer gear 54 has less number of teeth than that of the driven side internal gear 22 by a predetermined number. The drive side outer gear 52 has less number of teeth than that of the drive side internal gear 14 by the predetermined number. Therefore, the gears 52 and 54 have less number of teeth than the gears 14 and 22 by the same number.

The phase adjusting mechanism 300 adjusts the engine phase by a balance among the braking torque input to the brake member 130, the assist torque of the assist member 30, and a fluctuation torque transmitted from the camshaft 2 to the brake member 130. The assist torque acts on the brake member 130 in a direction opposite to the braking torque.

When the solenoid coil 150 adjust the braking torque so that the brake member 130 and the drive rotor 10 rotate at the same rotating speed, the planetary carrier 40 does not revolves with respect to the drive rotor 10. The planetary gear 50 does not perform the planetary motion and revolves together with the rotors 10 and 20. As a result, the phase adjusting mechanism 300 keeps the engine phase.

From the above holding condition, when the solenoid coil 150 increases the braking torque so that the brake member 130 makes the planetary carrier 40 rotates slower than the drive rotor 10, the planetary carrier 40 revolves relative to the drive rotor 10 in a retard, i.e., delaying direction. The planetary carrier 40 revolves against the assist torque. The planetary gear 50 performs the planetary motion and drives the drive rotor 10 and the driven rotor 20 by gears 14, 52, 54, and 22. In this case, the driven rotor 20 is relatively rotated to the drive rotor 10 in an advancing direction. As a result, the phase adjusting mechanism 300 advances the engine phase.

From the holding condition, when the solenoid coil 150 decreases the braking torque so that the brake member 130 makes the planetary carrier 40 rotates higher than the drive rotor 10, the planetary carrier 40 revolves relative to the drive rotor 10 in an advancing direction. The planetary carrier 40 revolves by receiving the assist torque. The planetary gear 50 performs the planetary motion and drives the drive rotor 10 and the driven rotor 20 by gears 14, 52, 54, and 22. In this case, the driven rotor 20 is relatively rotated to the drive rotor 10 in a delaying direction. As a result, the phase adjusting mechanism 300 delays the engine phase.

The fluid brake device 100 has a wax chamber 190, a movable member 120, and a wax 145.

The wax chamber 190 is formed on the cover member 112 of the case 110 which supports the movable member 120. An engaging member 119 is fixed to the cover member 112 with bolts etc. The engaging member 119 is formed in a circular dish shape with a cylindrical portion. The engaging member 119 defines a central hole 119b in a radial center. The engaging member 119 further has an engaging portion 119a which is protruded from the cylindrical portion to the central hole 119b. The engaging portion 119a protrudes as an internal flange and is formed over an entire circumference. The wax chamber 145 is defined by the cover member 112, the engaging member 119 and the movable member 120 to be divided and isolated from both the exterior of the case 110 and the fluid chamber 114. The wax chamber 190 is formed on an opposing wall portion 118. The opposing wall portion 118 is a part of the case 110, i.e., the cover member 112. The cover member 112 defines the fluid chamber 114. The wax chamber 190 is formed at a location facing the brake rotor 132 in the axial direction. The wax chamber 190 is formed on a wall which directly faces to the brake rotor 132 so that the wax chamber 190 can directly faces the brake rotor 132. The wax chamber 190 is formed so as to be thermally conductive with the fluid chamber 114. Thereby, heat generated in the fluid chamber 114 is efficiently transferred to the wax chamber 190.

The wax chamber 190 is formed in an annular groove shape. The wax chamber 190 has components such as a first portion 191 and a second portion 192. The first portion 191 accommodates a piston 124 of the movable member 120. The first portion 191 may be referred to as a variable volume portion because a volume is varied as the piston 124 moves. The first portion 191 is a cylindrical chamber extended along a movement direction, i.e., an arrow symbol in FIG. 1 and FIG. 5, of the movable member 120. The first portion 191 is extended toward the fluid chamber 114 from a portion where the piston 124, i.e., the inner part 124, is accommodated.

The second portion 192 is extended from an end 191a of the first portion 191 in a radial outside direction. The second portion 192 is extended along a direction crossing to the movement direction of the movable member 120. The second portion 192 is extended in a perpendicular direction to the movement direction. The second portion 192 may be referred to as a stable volume portion because a volume is constant even the piston 124 moves. The second portion 192 is located radial outside of the end 191a of the first portion 191, and forms an annular space. As a result, the end 191a which is a bottom end the first portion 191 in the extended direction and the second portion 192 are located on a place close to the fluid chamber 114 so that the end 191a and the second portion 192 are easy to receive heat from the fluid chamber 114.

The movable member 120 is made of metal, and is formed in a cylindrical shape with a bottom. The movable member 120 has a bottom wall 121 and a cylindrical wall 122. The movable member 120 also has the piston 124 as a pusher portion. The piston 124 is formed on an end of the cylindrical wall 122 opposite to the bottom wall 121. The piston 124 has a flange portion 125 radially extended from a periphery of the cylindrical wall 122. The piston 124 is accommodated in the wax chamber 190 with the flange portion 125. The piston 124 is able to slide on a surface defining the wax chamber 190. The movable member 120 is supported by the cover member 112 of the case 110 in a movable fashion in the axial direction.

The movable member 120 is arranged on the central hole 112a formed on the cover member 112 in a coaxial manner. The movable member 120 is located next to a radial center portion 133 of the brake rotor 132 with respect to the axial direction of the brake member 130. The movable member 120 has an exposed portion, the bottom wall 121, which is exposed to the fluid chamber 114 of the case 110 through the central hole 112a. The fluid chamber 114 contains the MRF 140. Therefore, the capacity, volume, of the fluid chamber 114 can be increased and decreased as the movable member 120 moves along the axial direction.

When the movable member 120 moves in a direction to separate the movable member 120 from the case 110, at the end position, the movable member 120 is restricted to move further by engaging the flange portion 125 to an engaging portion 119a formed on the engaging member 119. In other words, the supporting member, the engaging member 119, has the engaging portion 119a which engages with the movable member 120 when the movable member 120 moves in a direction to separate the movable member 120 from the supporting member. The movable member 120 is prevented from completely separating from the case 110 by the engaging structure provided by the engaging portion 119a and the flange portion 125.

The wax 145 is made of a paraffin wax, for example. The wax 145 is filled in the wax chamber 190 defined by the piston 124. The wax 145 is in a solid phase in a room temperature, for example, and changes its phase to a liquid phase by melting in a range of 40 to 100 Celsius degrees. The wax 145 increases its volume by expanding thermally in response to the temperature increase.

In addition to the surrounding temperature, the temperature in the fluid chamber 114 may be increased by heat generated within the fluid chamber 114. For example, friction between the MRF 140 and the brake member 130 caused by a braking torque input increases a temperature. Generated heat increases a temperature of the MRF 140 and the fluid chamber 114, and is transferred to the wax chamber 190 through the opposing wall portion 118. Thereby, the wax 145 expands while carrying out a phase transition from a solid phase to a liquid phase. Then, the wax 145 forces the movable member 120 to move to increase the volume of the fluid chamber 114 by pushing the piston 124. As the temperature in the fluid chamber 114 is decreased, the wax 145 in the wax chamber 190 is contracted. Thereby, the wax 145 stops applying the thrust to the piston 124. In addition, since the inner pressure in the fluid chamber 114 is decreased, the movable member 120 moves to decrease the volume of the fluid chamber 114 by a pressure difference between the exterior of the case 110 and the interior of the fluid chamber 114. Double dashed line in FIG. 5 shows the moving direction of the movable member 120.

Hereinafter, a relationship between a temperature increase in the fluid chamber 114 and a volume increase in the fluid chamber 114 responsive to the temperature increase is explained in detail.

The fluid brake device 100 is expected and designed to work from a minimum temperature to a maximum temperature. The minimum temperature may be a minimum surrounding temperature in a location where the fluid brake device 100 is placed and used. The minimum temperature may be about −30 Celsius degrees for example. The maximum temperature may be a maximum surrounding temperature in a location where the fluid brake device 100 is placed and used. The maximum temperature may be a maximum temperature in the fluid chamber 114. The maximum temperature may be about 130 Celsius degrees for example.

The temperature in the fluid chamber 114 may be increased higher than the surrounding temperature temporarily by heat generated in the fluid chamber by friction between the MRF 140 and the brake rotor 132. However, as the fluid brake device 100 is continuously used, the difference in temperatures between the fluid chamber 114 and the surrounding temperature becomes small gradually. Therefore, it is possible to assume that the maximum surrounding temperature as the maximum temperature and the minimum surrounding temperature as the minimum temperature for a purpose of designing and defining characteristics of the fluid brake device 100.

Assume that the surrounding temperature of the fluid brake device 100 is increased from the minimum temperature to the maximum temperature. In response to the temperature increase, both a vapor pressure of the MRF 140 in the fluid chamber 114 and a vapor pressure of the air in the fluid chamber 114 increase. In addition, both a volume of the MRF 140 and a volume of the air expand. An internal pressure in the fluid chamber 114 is increased by the increase of the vapor pressure and the expansion of the volume.

On the other hand, the movable member 120 increases a capacity of the fluid chamber 114 in response to the temperature increase from the minimum temperature to the maximum temperature. The wax 145, i.e., the variable-volume member and the movable member 120 are designed to increase a volume of the fluid chamber 114 by a predetermined increased amount when the temperature in the fluid chamber 114 is increased from the minimum temperature to the maximum temperature. The predetermined increased amount is set to be able to cancel a possible increased amount of the inner pressure of the fluid chamber 114 that may be caused by the temperature increase in the fluid chamber 114 by using a possible decreased amount of the inner pressure of the fluid chamber 114 that may be caused by the capacity increase, i.e., the volume increase.

In other words, the wax 145, i.e., the variable-volume member and the movable member 120 are designed to increase a volume of the fluid chamber 114 by a predetermined increased amount when the temperature in the fluid chamber 114 is increased from the minimum temperature to the maximum temperature. The predetermined increased amount is capable of maintaining a pressure in the fluid chamber 114 within an allowable range when the temperature in the fluid chamber 114 is increased from the minimum temperature to the maximum temperature. The allowable range may be set to zero "0", or a tolerance that can prevent or reduce a leakage through the sealing structure 130. The device 100 has the movable member 120 driven by the thermo-sensitive wax 145 so that a volume of the fluid chamber 114 is increased as the temperature in the fluid chamber 114 is increased. The movable member 120 is driven to maintain a pressure in the fluid chamber 114 within an allowable range when the temperature in the fluid chamber 114 is changed.

The movable member 120 is actively driven and moved by the wax 145 filled in the wax chamber 190 which is formed separately from the fluid chamber 114. Therefore, the movable member 120 can keep movement to increase the volume of the fluid chamber 114 until the volume of the fluid chamber 114 becomes a predetermined volume by which the pressure increase in the fluid chamber 114 resulting from the temperature increase can be canceled. As a result, since the fluid chamber 114 get an increased volume by the movement of the movable member 120, it is not easy to keep the internal pressure in the fluid chamber 114 in an increased state caused by the temperature increase. It is possible to reduce the leakage of the MRF 140 through the sealing structure 160. Therefore, it is possible to suppress a change of the brake characteristic resulting from the leakage of the MRF 140.

Heat transfer from the fluid chamber 114 to the wax chamber 190 becomes smooth by forming the wax chamber 190 on the opposing wall portion 118 which comes in direct contact with the MRF 140 used as a heat source. The wax chamber 190 has the end 191a and the second portion 192 both are located close to the fluid chamber 114. Therefore, the wax chamber 190 may establish a good thermal conductivity with the fluid chamber 114. It is possible to improve thermal sensitivity of the wax chamber 190 and the wax 145 to the fluid chamber 114 and the MRF 140. It is possible to improve response of the wax 145 to the temperature change in the fluid chamber 114. Therefore, the pressure change in the fluid chamber 114 can be certainly cancelled by the volume change in the fluid chamber 114. In detail, it is possible to improve response of expansion of the wax 145. Therefore, it is possible to cancel the pressure increase by the volume increase in the fluid chamber 114. It is possible to reduce a leakage of the MRF 140 caused by the increased internal pressure in the fluid chamber 114. Therefore, it is possible to suppress a change of the braking characteristic resulting from the leakage of the MRF 140.

Usually, a thermal expansion with a phase transition of a matter is larger than a thermal expansion without a phase transition. The wax 145 in this embodiment performs the thermal expansion with a phase transition. Therefore, it is possible to achieve a large stroke of the movable member 120 by using the wax 145.

In addition, the wax 145 shows an ability to flow. Therefore, a part of the wax 145 filled in the second portion 192 can flow into the first portion 191 as the part in the second portion 192 expands. The part of the wax 145 in the first portion 191 is pushed toward the piston 124 by the part of the wax 145 in the second portion 192. The part of the wax 145 in the first portion 191 flows and moves to push the piston 124. Simultaneously, the part of the wax 145 in the first portion 191 when the fluid chamber 114 is cold may be increased in temperature and expand itself. Since the wax chamber 190 includes an enlarged portion, i.e., the second portion 192, which may push the piston 124 by the wax 145, it is possible to increase a stroke of the movable member 120.

It is possible to increase an additionally available volume in the fluid chamber 114 in response to the temperature increase. The wax 145 and the movable member 120 provide a pressure reducing function. The fluid brake device 100 may be used in an environment where temperature may be largely increased to produce a large pressure increase. The pressure reducing function provided by the wax 145 and the movable member 120 sufficiently performs to cancel the large pressure increase. Therefore, it is possible to reduce the leakage of the MRF 140 resulting from the pressure increase in the fluid chamber 114.

In this embodiment, a range of the surrounding temperature in which the fluid brake device 100 is expected to be used is determined beforehand. It is possible to design and set an decreasing amount performed by the wax 145 and the movable member 120 beforehand so that the decreasing amount is equal to a possible increasing amount of the internal pressure of the fluid chamber 114. It is possible to surely reduce the leakage of the MRF 140 resulting from the pressure increase in the fluid chamber 114. Therefore, it is possible to surely suppress a change of the braking characteristic resulting from the leakage of the MRF 140.

The engaging portion 119a prevents the movable member 120 from disassembling from the case 110 by engaging the movable member 120. Therefore, it is possible to reduce a leakage of the MRF 140 through the central hole 112a in addition to the leakage through the sealing structure 160.

The wax chamber 190, the thermo-sensitive chamber, is located in a side by side manner with a radial center portion 133 of the brake rotor 132 in the axial direction. It is possible to provide a certain sufficient distance between the wax chamber 190 and the solenoid coil 150 placed radial outside of the brake rotor 132. Therefore, the magnetic flux of the solenoid coil 150 may pass the case 110, the MRF 140, and the brake rotor 132, without being interrupted by the wax chamber 190. It is possible to suppress decreasing of a braking torque input to the brake member 130 even if the fluid brake device 100 has the wax chamber 190 and the movable member 120.

In this embodiment, since the wax 145 and the movable member 120 works to keep the internal pressure in constant, it is possible to reduce the leakage of the MRF 140. As a result, it is possible to suppress a brake characteristic change caused by the leakage of the MRF 140. Therefore, it is possible to maintain an adjusting accuracy of the engine phase which may be influenced by the brake characteristic. In this embodiment, a small amount of the MRF 140 caught on the seal gaps 180 and 181 can certainly perform a self-sealing function by suppressing the increase of the internal pressure in the fluid chamber 114. It is possible to reduce a friction drag acting on the brake shaft 131. Therefore, it is possible to avoid a torque loss which is caused by the friction drag and which worsens the fuel consumption of the internal combustion engine.

In this embodiment, the case 110 provides a supporting member. The piston 124 provides an inner part of the movable member. The solenoid coil 150 provides a viscosity control section. The solenoid coil 150 carries out variable control of the viscosity of the MRF by modifying magnetic flux passing through the MRF in the fluid chamber. The wax chamber 190 provides a thermo-sensitive chamber. The wax chamber 190 is formed on a supporting member provided by one of the case 10 and the brake member 130 so as to transfer heat from the fluid chamber. The first chamber portion 191 provides a first thermo-sensitive chamber portion. The second chamber portion 192 provides a second thermo-sensitive chamber portion. The movable member 120 has the piston 124 facing the wax chamber 190, and an exposed part exposed to the fluid chamber by being supported on the supporting member 110 or 130. The wax 145 provides a variable-volume member. The wax 145 is disposed in the wax chamber 190. The wax 145 is capable of changing a volume itself in response to a temperature in the wax chamber 190. The wax 145 is capable of applying force on the piston 124 to move the movable member 120 so that a volume of the fluid chamber is increased as the temperature in the wax chamber 190 is increased.

(Second Embodiment)

Figure 6:
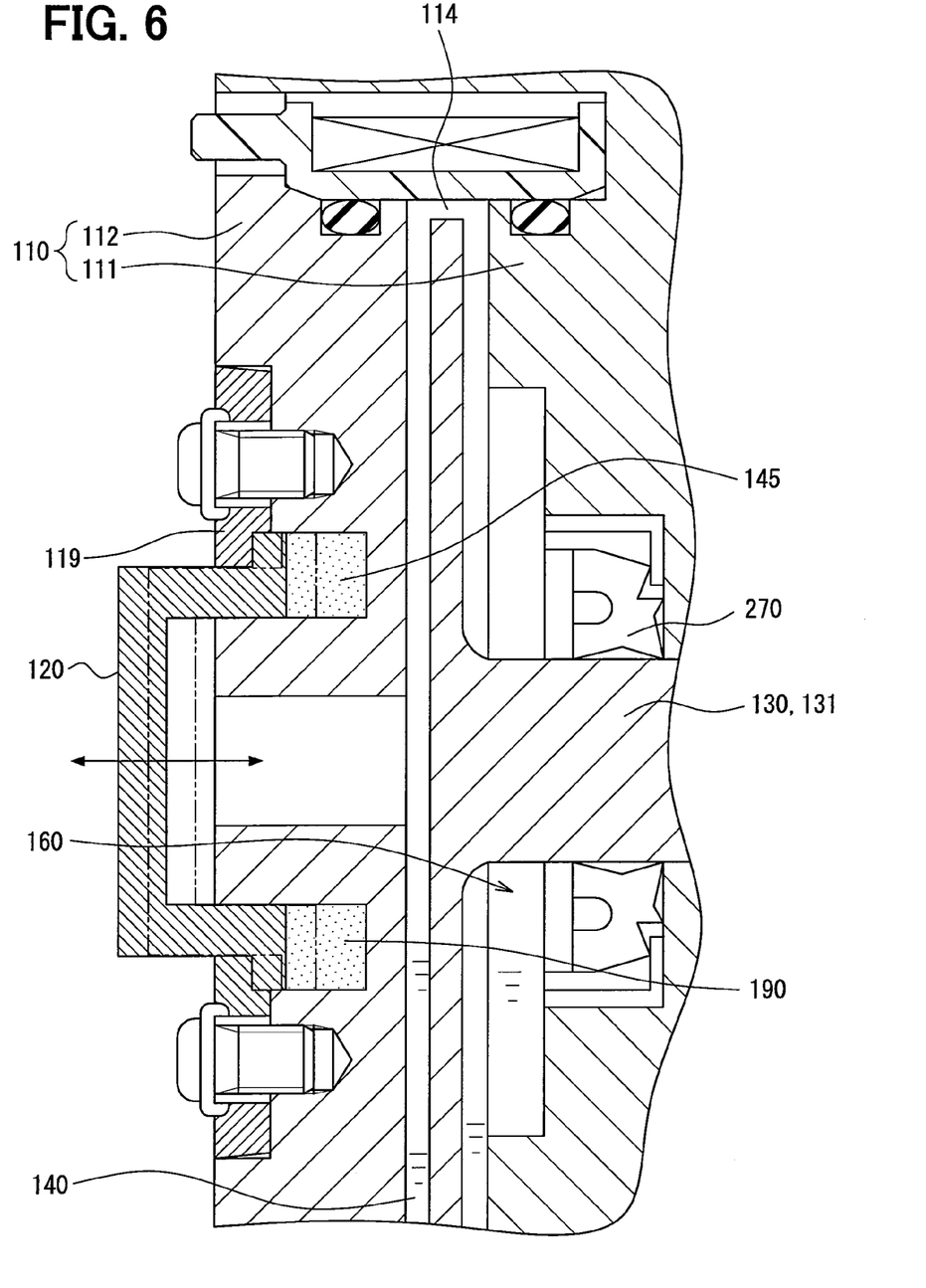
FIG. 6 is a cross sectional view showing a fluid brake device according to a second embodiment of the disclosure.

As shown in FIG. 6, the second embodiment is a modification of the first embodiment. In this embodiment, the cover member 112 and the engaging member 119 are different from the first embodiment. In this embodiment, the wax chamber 190 does not have corresponding portion to the second portion 192. The wax chamber 190 defines a simple cylindrical chamber. In addition, the sealing structure 160 employs an physical contact type oil seal 270 instead of the magnetic seal sleeve 170. The oil seal 270 is held on the case 110. The oil seal 270 surrounds a peripheral surface of the brake shaft 131. The oil seal 270 comes in directly contact with the peripheral surface of the brake shaft 131. The oil seal 270 seals between the brake shafts 131 and the fixing member 111. The oil seal 270 prevents the MRF 140 from leaking out to the exterior of the case 110.

The movable member 120 is moved by the wax 145 until the volume of the fluid chamber 114 becomes an increased volume that can cancel the pressure increase caused by the temperature increase. In other words, the movable member 120 is moved by the wax 145 to keep the pressure in the fluid chamber 114 within a predetermined range. As a result, since the fluid chamber 114 get an increased volume by the movement of the movable member 120, it is not easy to keep the internal pressure in the fluid chamber 114 in an increased state caused by the temperature increase. It is possible to reduce the leakage of the MRF 140 through the sealing structure 160. Therefore, it is possible to suppress a change of the brake characteristic resulting from the leakage of the MRF 140.

In addition, since the pressure increase in the fluid chamber 114 can be reduced by the wax 145 and the movable member 120, it is possible to use the oil seal 270 that applies smaller tightening pressure on the brake shaft 131. It is possible to reduce a friction drag acting on the brake shaft 131. Therefore, it is possible to avoid a torque loss which is caused by the friction drag and which worsens the fuel consumption of the internal combustion engine.

(Third Embodiment)

Figure 7:
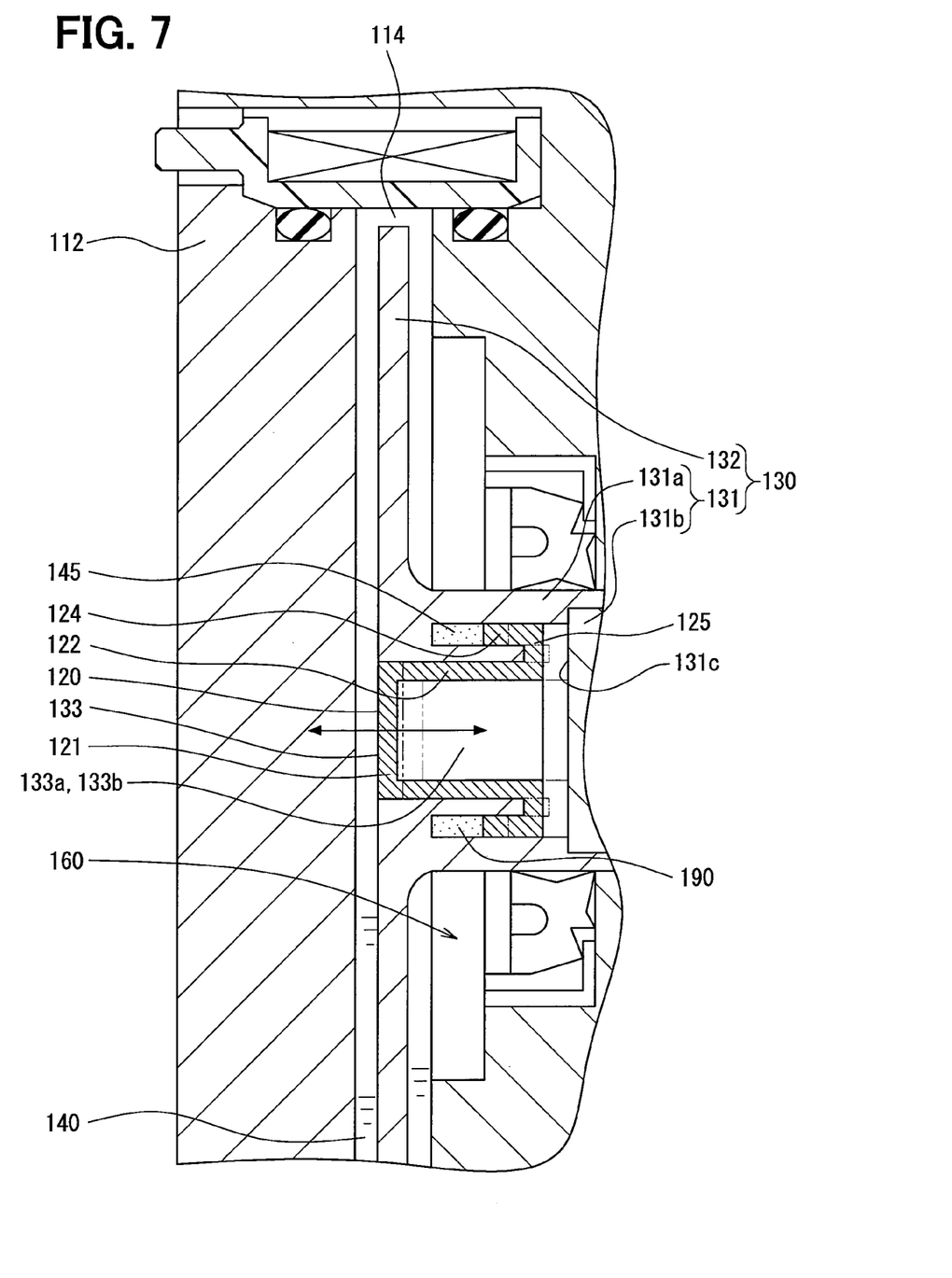
FIG. 7 is a cross sectional view showing a fluid brake device according to a third embodiment of the disclosure.

As shown in FIG. 7, the third embodiment is a modification of the second embodiment. In this embodiment, the movable member 120 is accommodated in a bore 133a formed on the center portion 133 of the brake member 130. The bore 133a has an axis that is the same as the axis of the brake member 130. The wax chamber 190 is formed on the brake member 130. The movable member 120 has a cylindrical wall 122 and a piston 124 formed in a cylindrical shape. The piston 124 is disposed on a radial outside of the cylindrical wall 122. A flange portion 125 connects the piston 124 and the cylindrical wall 122 at axial ends thereof. The flange portion 125 is an annular disc. The wax chamber 190 is an annular chamber placed on a radial outside of the bore 133a. The bore 133a defines a small diameter portion where the movable member 120 is mainly supported and a large diameter portion where both the flange portion 125 is placed. The piston 124 is slidable on walls defining the wax chamber 190. The movable member 120 is supported by the brake member 130 in a movable manner. The movable member 120 occupies a center portion of the brake rotor 132.

The movable member 120 has a bottom wall 121, i.e., an exposed portion, which is exposed to the fluid chamber 114. Therefore, the capacity, volume, of the fluid chamber 114 can be increased and decreased as the movable member 120 moves along the axial direction. The brake member 130 has a brake shaft 131 that is made of at least two brake shaft components 131a and 131b. The wax chamber 190 is formed on one of the brake shaft component 131a. The brake shaft components 131a and 131b are joined after the movable member 120 and the wax 145 are assembled. The movable member 120 and the brake shaft components 131a and 131b define a back chamber 133b. The bottom wall 121 is placed between the cover member 112 and the back chamber 133b. The bottom wall 121 has one side exposed to the fluid chamber 114 and an opposite side facing the back chamber 133b. The back chamber 133b is communicated with an exterior of the case through a vent hole (not illustrated) formed on the brake shaft component 131b. The movable member 120 stops moving in a direction to increase the volume of the fluid chamber 114 when the flange portion 125 comes in contact with an end face 131c of the brake shaft component 131b in the axial direction. The piston 124 is prevented from being disassembled from the wax chamber 190 by an abutment of the flange portion 125 on the end face 131c.

The movable member 120 is moved by the wax 145 until the volume of the fluid chamber 114 becomes an increased volume that can cancel the pressure increase caused by the temperature increase. As a result, since the fluid chamber 114 get an increased volume by the movement of the movable member 120, it is not easy to keep the internal pressure in the fluid chamber 114 in an increased state caused by the temperature increase. It is possible to reduce the leakage of the MRF 140 through the sealing structure 160. Therefore, it is possible to suppress a change of the brake characteristic resulting from the leakage of the MRF 140.

In this embodiment, the brake member 130 provides a supporting member.

(Fourth Embodiment)

Figure 8:
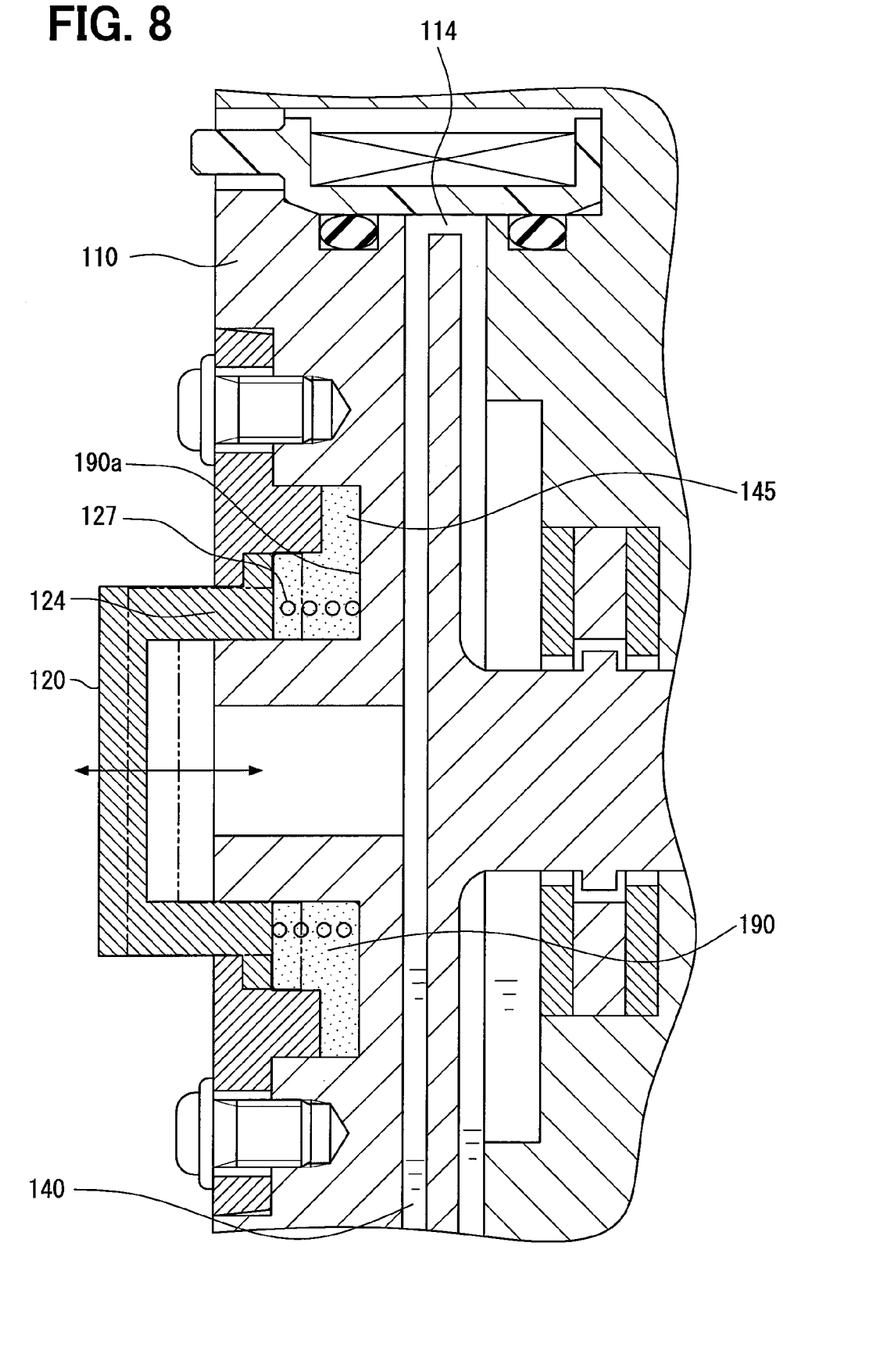
FIG. 8 is a cross sectional view showing a fluid brake device according to a fourth embodiment of the disclosure.

As shown in FIG. 8, this embodiment is a modification of the first embodiment. A coil spring 127 is accommodated in the wax chamber 190 with the wax 145. The coil spring 127 is formed by coiling a wire rod made of metal etc. The coil spring 127 is arranged on the axis of the movable member 120 within the wax chamber 190. The coil spring 127 has one end engaged on and connected to the piston 124 of the movable member 120. The coil spring 127 also has the other end engaged on and connected to a wall 190a opposite to the piston 124. The wall 190a is a part of wall defining the wax chamber 190 within the case 110. The coil spring 127 is located between the movable member 120 and the case 110. The coil spring 127 applies a resilience to the piston 124 of the movable member 120. The resilience forces the movable member 120 to move to decrease the volume of the fluid chamber 114. In other words, the resilient member, the coil spring 127, pushes the movable member 120 in a direction in which the movable member 120 returns to an initial position. In detail, the coil spring 127, the resilient member, applies a resilience force to the piston 124 by contracting itself. The resilience force acts in a direction to pull the piston 124 back so that the piston 124 approaches to the wall 190a. The movable member 120 stops moving at a position where forces acting on the movable member 120 balance. For example, the resilience force applied by the coil spring 127 and a pushing and pulling thrust force generated by the wax 145 are considered to determine the position where the movable member 120 stops. A spring strength and spring rate of the coil spring 127 is designed and set so that the pressure increase in the fluid chamber 114 is substantially cancelled at the position where the movable member 120 stops moving.

In the above structure, when the wax 145 contracts in response to a temperature decrease in the fluid chamber 114, the movable member 120 moves to decrease the volume of the fluid chamber 114 by a pressure difference between an inside and an outside of the wax chamber 145. At this time, since the movable member 120 is forced by the resilience applied by the coil spring 127, the movement of the movable member 120 which decreases the volume of the fluid chamber 114 is certainly achieved. It is possible to provide a smooth movement of the movable member 120 in response to a temperature change in the fluid chamber 114. Therefore, it is possible to reduce the leakage of the MRF 140. As a result, it is possible to certainly achieve an advantage suppressing a brake characteristic change caused by the leakage of the MRF 140.

In addition, since the coil spring 127 is disposed in the wax chamber 190, it is possible to avoid enlarging the size of the fluid brake device 100 and the variable valve timing apparatus 1.

In addition, since both the pushing force applied by the wax 145 and the resilience force applied by the coil spring 127 act commonly on the piston 124, the pushing portion, it is possible to reduce moment on the movable member 120 caused by the pushing force and the resilience force. Therefore, it is possible to reduce inclination of the movable member 120 with respect to the case 110. The movable member 120 can smoothly perform the movement which changes the volume of the fluid chamber 114. As a result, it is possible to certainly achieve an advantage suppressing a brake characteristic change.

The coil spring 127 provides the resilient member. The coil spring 127 applies a resilience to the movable member 120. The resilience forces the movable member 120 to decrease the volume of the fluid chamber 114.

(Fifth Embodiment)

Figure 9:
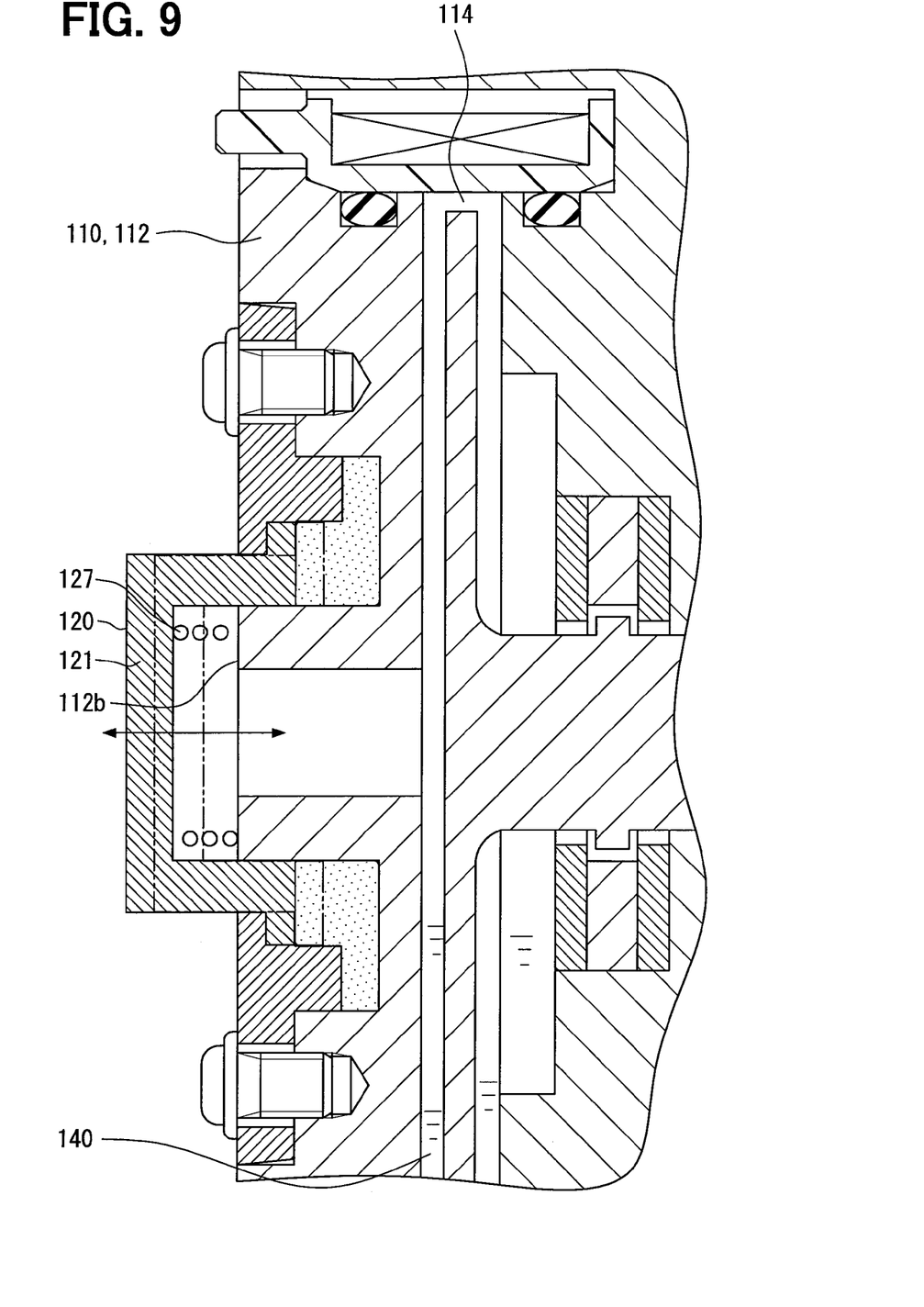
FIG. 9 is a cross sectional view showing a fluid brake device according to a fifth embodiment of the disclosure.

As shown in FIG. 9, the fifth embodiment is a modification of the fourth embodiment. The coil spring 127 and the movable member 120 are arranged on the same axis. The coil spring 127 is disposed between the bottom wall 121 of the movable member 120 and an end face 112b which is formed on an axial end of the cover member 112. One end of the coil spring 127 is engaged on the bottom wall 121 of the movable member 120. The other end of the coil spring 127 is engaged on the end face 112b of the cover member 112. The coil spring 127, the resilient member, applies a resilience force to the movable member 120 by contracting itself. The resilience force acts in a direction to pull the bottom wall 121 back so that the bottom wall 121 approaches to the end wall 112b.

(Sixth Embodiment)

Figure 10:
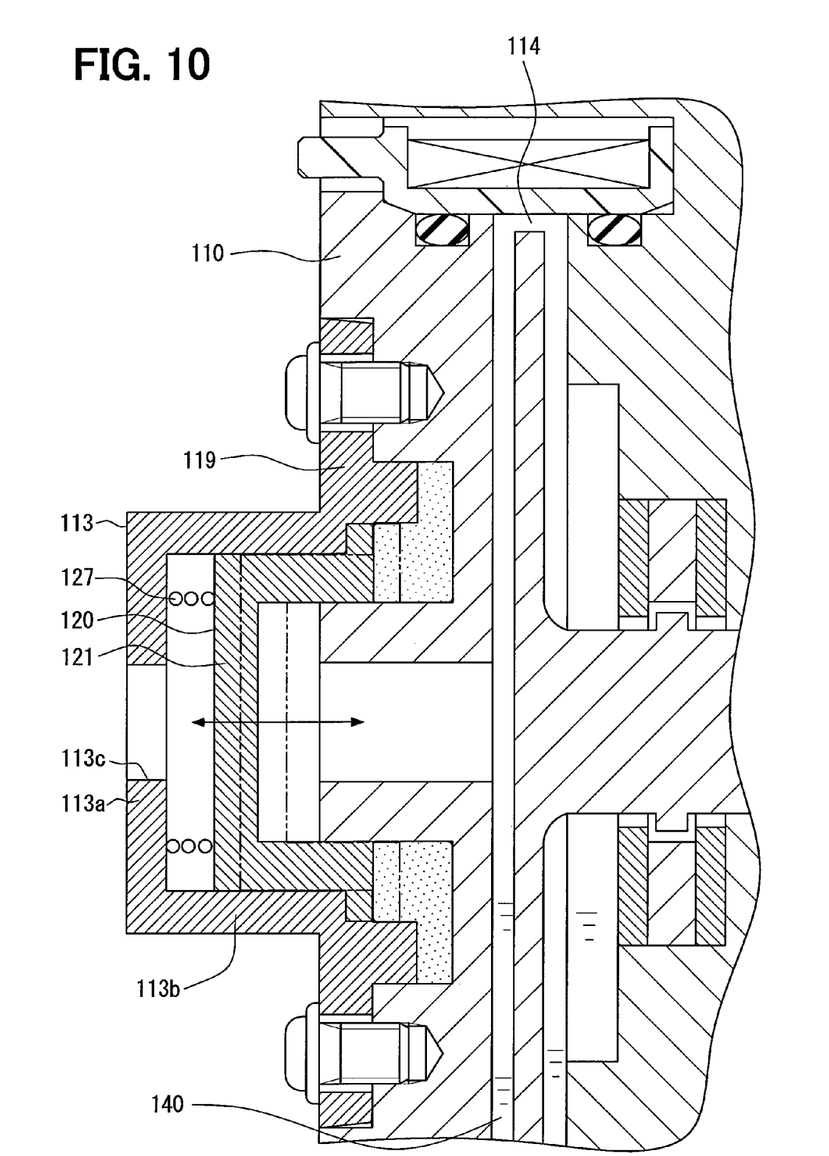
FIG. 10 is a cross sectional view showing a fluid brake device according to a sixth embodiment of the disclosure.

As shown in FIG. 10, the sixth embodiment is a modification of the fourth embodiment. In the sixth embodiment, a holder portion 113 for holding the coil spring 127 is formed on the engaging portion 119 of the case 110. The holder portion 113 has a disk shaped bottom wall 113a and a cylindrical wall 113b, and covers the movable member 120. In addition, a vent hole 113c for suppressing a pressure increase in a chamber between the bottom wall 113a and the movable member 120 is formed on the bottom wall 113a.

The coil spring 127 and the movable member 120 are arranged on the same axis. The coil spring 127 is disposed between the bottom wall 113a of the holder portion 113 and the bottom wall 121 of the movable member 120. The coil spring 127, the resilient member, applies a resilience force to the movable member 120 by expanding itself. The resilience force acts in a direction to push the bottom wall 121 back so that the bottom wall 121 goes away from the bottom wall 113a.

Since the movable member 120 is forced by the resilience applied by the coil spring 127, the movement of the movable member 120 which decreases the volume of the fluid chamber 114 is certainly achieved. It is possible to provide a smooth movement of the movable member 120 in response to a temperature change in the fluid chamber 114. Therefore, it is possible to reduce the leakage of the MRF 140. As a result, it is possible to certainly achieve an advantage suppressing a brake characteristic change caused by the leakage of the MRF 140.

(Other Embodiments)

Although the present disclosure is described based on the illustrated embodiments, the present disclosure should not be limited to such embodiments illustrated, may be implemented in other ways and be applied to any combinations and modifications without departing from the scope of the disclosure.

In the embodiments, the movable member 120 is arranged in a side by side manner with the radial center portion 133 of the brake rotor 132 with respect to the axial direction. In the second embodiment, the movable member 120 is arranged on the radial center portion 133 of the brake rotor 132. Alternatively, the location of the movable member may be changed to any location where the movable member can at least change the volume of the fluid chamber.

The first portion 191 of the first embodiment and the wax chamber 190 of the second and third embodiments are formed in a shape to be extended toward the fluid chamber along the axial direction. However, the wax chamber may be formed in any shape which can at least provide a good thermal conductance from the fluid chamber. For example, the wax chamber may be divided into plurality.

In the above-mentioned embodiments, the wax 145 is used as the variable-volume member. The wax 145 can expand in volume by melting in response to the temperature increase from the minimum temperature to the maximum temperature. Alternatively, the variable-volume member may be provided by a wax that does not melt even the temperature is increased from the minimum temperature to the maximum temperature. Alternatively, materials other than wax may be used as the variable-volume member.

In the embodiments, the engaging portion 119*a* prevents the movable member 120 from being disassembled from the case 110 by engaging the movable member 120. The shape of the engaging member is not limited to the embodiments and may be modified. In the embodiments such as the third embodiment, since it is hard to disassemble the movable member, it is possible to remove the engaging portion in such embodiments.

In the above embodiments, the coil spring 127 is used as the resilient member to apply the resilience to the movable member 120. However, the resilient member is not limited to the coil spring and may be provided by components which is capable of applying the resilience to the movable member. For example, a metal made spring washer may be used as the resilient member. Alternatively, a member which is capable of being expanded and contracted and is made of material such as rubber and silicon may be used as the resilient member.

Alternatively, the phase adjusting mechanism 300 may be replaced by any other mechanism that can adjust the engine phase according to the input braking torque to the brake member 130 via the engagement of the brake shaft 131. In the embodiment, the present disclosure is applied to the apparatus for varying the valve timing of the intake valve. The present disclosure may be applied to an apparatus for varying the valve timing of an exhaust valve, or an apparatus for varying the valve timing of both the intake valve and the exhaust valve. The present disclosure may be applied to any apparatus that utilizes a braking torque.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A fluid brake device comprising:
a case defining a fluid chamber inside;
magneto-rheological fluid, which has a viscosity variable according to a magnetic flux passing therethrough, contained in the fluid chamber;
a viscosity control section to carry out variable control of the viscosity of the magneto-rheological fluid by modifying magnetic flux passing through the magneto-rheological fluid in the fluid chamber;
a brake member which has a brake shaft penetrating the case and is rotatably supported on the case to come into contact with the magneto-rheological fluid so that the brake member receives a braking torque according to the viscosity of the magneto-rheological fluid;
a sealing structure which seals between the case and the brake shaft;
a thermo-sensitive chamber formed on a supporting member provided by one of the case and the brake member so as to be thermally conductive with the fluid chamber;
a movable member which has an inner part accommodated in the thermo-sensitive chamber, and an exposed part exposed to the fluid chamber by being supported on the supporting member; and
a variable-volume member disposed in the thermo-sensitive chamber, the variable-volume member being configured to change a volume itself in response to a temperature in the thermo-sensitive chamber, and applying force on the inner part to move the movable member so that a volume of the fluid chamber is increased as the temperature in the thermo-sensitive chamber is increased.

2. The fluid brake device according to claim 1, wherein the brake member has a brake rotor formed in a circular disk shape and disposed in the fluid chamber;
the viscosity control section supplies the magnetic flux which passes the brake rotor in an axial direction; and
the thermo-sensitive chamber is formed on an opposing wall portion which is a part of the case provided as the supporting member and defines the fluid chamber at a location facing the brake rotor in an axial direction.

3. The fluid brake device according to claim 1, wherein the thermo-sensitive chamber is formed on the case provided as the supporting member, and includes a portion extended toward the fluid chamber from a portion where the inner part is accommodated.

4. The fluid brake device according to claim 1, wherein the variable-volume member is made from a material meltable by temperature increase in the fluid chamber.

5. The fluid brake device according to claim 4, wherein the thermo-sensitive chamber includes:
a first portion which accommodates the inner part of the movable member and is extended in a movement direction of the movable member; and
a second portion extended from the first portion in a direction crossing to the movement direction.

6. The fluid brake device according to claim 1, wherein the fluid brake device is expected to work from a minimum temperature to a maximum temperature, and wherein the variable-volume member and the movable member are designed to increase volume of the fluid chamber by a predetermined increased amount when the temperature in the fluid chamber is increased from the minimum temperature to the maximum temperature, and wherein the predetermined increased amount can maintain a pressure in the fluid chamber within an allowable range when the temperature in the fluid chamber is increased from the minimum temperature to the maximum temperature.

7. The fluid brake device according to claim 1, wherein the supporting member has an engaging portion which engages with the movable member when the movable member moves in a direction to separate the movable member from the supporting member.

8. The fluid brake device according to claim 1, further comprising
a resilient member which applies a resilience to the movable member, the resilience forcing the movable member to decrease the volume of the fluid chamber.

9. The fluid brake device according to claim 8, wherein the resilient member is placed between the movable member and the supporting member and applies the resilience to the movable member by contracting.

10. The fluid brake device according to claim 8, wherein the resilient member is disposed in the thermo-sensitive chamber and applies the resilience to the inner part.

11. The fluid brake device according to claim 1, wherein the brake member has a brake rotor formed in a circular disk shape and disposed in the fluid chamber;

the viscosity control section is placed radial outside of the brake rotor; and the thermo-sensitive chamber is located in a side by side manner with a radial center portion of the brake rotor in an axial direction of the brake member.

12. A variable valve timing apparatus for adjusting a valve timing of a valve, which is driven to open and close by a camshaft to which torque transmitted from a crankshaft in an internal combustion engine, the variable valve timing apparatus comprising:

the fluid brake device claimed in claim 1; and a phase adjusting mechanism engaged with the brake shaft at an outside of the case for adjusting a relative phase between the crankshaft and the camshaft according to the braking torque acting on the brake member.

* * * * *